(12) United States Patent
Prichard et al.

(10) Patent No.: US 11,998,987 B2
(45) Date of Patent: Jun. 4, 2024

(54) ADDITIVE MANUFACTURING TECHNIQUES AND APPLICATIONS THEREOF

(71) Applicant: Kennametal Inc., Latrobe, PA (US)

(72) Inventors: Paul D. Prichard, Greensburg, PA (US); Kevin Gamble, Stahlstown, PA (US); John Skwara, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 20 days.

(21) Appl. No.: 15/831,779

(22) Filed: Dec. 5, 2017

(65) Prior Publication Data

US 2019/0168299 A1 Jun. 6, 2019

(51) Int. Cl.

| | |
|---|---|
| *B33Y 70/00* | (2020.01) |
| *B22F 7/06* | (2006.01) |
| *B22F 10/14* | (2021.01) |
| *B22F 10/38* | (2021.01) |
| *B28B 1/00* | (2006.01) |

(Continued)

(52) U.S. Cl.
CPC ............... *B22F 7/06* (2013.01); *B22F 10/14* (2021.01); *B22F 10/38* (2021.01); *B28B 1/001* (2013.01); *B33Y 10/00* (2014.12); *B33Y 70/00* (2014.12); *B33Y 80/00* (2014.12); *B22F 10/28* (2021.01); *B22F 2207/17* (2013.01); *B22F 2301/15* (2013.01); *B22F 2301/35* (2013.01); *B22F 2998/10* (2013.01); *C22C 1/0433* (2013.01); *C22C 29/08* (2013.01); *C22C 33/02* (2013.01); *Y10T 428/12021* (2015.01)

(58) Field of Classification Search
CPC ............... B22F 3/0008; C04B 38/0038; Y10T 428/12021; B33Y 70/00; B33Y 80/00
USPC ......................................................... 428/547
See application file for complete search history.

(56) References Cited

U.S. PATENT DOCUMENTS

| | | |
|---|---|---|
| 2,884,227 A | 4/1959 | Anders |
| 3,640,356 A | 2/1972 | Feenstra |

(Continued)

FOREIGN PATENT DOCUMENTS

| | | |
|---|---|---|
| CN | 2078789 U | 6/1991 |
| CN | 1165907 A | 11/1997 |

(Continued)

OTHER PUBLICATIONS

Heijink et al., "Prosthesis design and stress profile after hip resurfacing: a finite element analysis," Dec. 2008, Journal of Orthopaedic Surgery, URL: <https://journals.sagepub.com/doi/pdf/10.1177/230949900801600312>, pp. 326-332 (Year: 2008).*

(Continued)

*Primary Examiner* — Katherine A Christy

(74) *Attorney, Agent, or Firm* — Larry R. Meenan

(57) ABSTRACT

In one aspect, a method of making a sintered article comprises providing a composite article comprising a porous exterior printed from a powder composition via one or more additive manufacturing techniques, the porous exterior defining an interior volume and providing a loose powder component in the interior volume. The porous exterior and loose powder component are simultaneously sintered to provide the sintered article comprising a sintered interior and sintered exterior.

20 Claims, 4 Drawing Sheets

(51) Int. Cl.
  B33Y 10/00 (2015.01)
  B33Y 80/00 (2015.01)
  B22F 10/28 (2021.01)
  C22C 1/04 (2023.01)
  C22C 29/08 (2006.01)
  C22C 33/02 (2006.01)

(56) References Cited

U.S. PATENT DOCUMENTS

| | | | |
|---|---|---|---|
| 4,059,879 A * | 11/1977 | Chmura | B21H 1/12 |
| | | | 384/513 |
| 4,925,490 A * | 5/1990 | Nagai | C04B 38/0051 |
| | | | 75/238 |
| 5,336,465 A * | 8/1994 | Matsunaga | A61F 2/30767 |
| | | | 419/2 |
| 6,220,117 B1 | 4/2001 | Butcher | |
| 6,353,771 B1 | 3/2002 | Southland | |
| 6,572,447 B2 | 6/2003 | Veik et al. | |
| 7,776,256 B2 | 8/2010 | Smith | |
| 7,832,456 B2 | 11/2010 | Calnan et al. | |
| 7,832,457 B2 | 11/2010 | Calnan et al. | |
| 8,007,714 B2 | 8/2011 | Mirchandani et al. | |
| 8,342,268 B2 | 1/2013 | Lockstedt et al. | |
| 8,459,380 B2 | 6/2013 | Mirchandani et al. | |
| 8,770,324 B2 | 7/2014 | Smith et al. | |
| 9,068,408 B2 | 6/2015 | Vempati et al. | |
| 9,186,726 B2 | 11/2015 | Keane et al. | |
| 9,393,674 B2 | 7/2016 | Keshavan | |
| 9,435,211 B2 | 9/2016 | Xu | |
| 9,975,182 B2 | 5/2018 | Stoyanov | |
| 11,420,273 B2 | 8/2022 | Fang et al. | |
| 2002/0023635 A1 | 2/2002 | Veik et al. | |
| 2003/0000339 A1 | 1/2003 | Findeisen et al. | |
| 2003/0034177 A1 | 2/2003 | Chitwood et al. | |
| 2004/0134309 A1 | 7/2004 | Liu | |
| 2007/0102199 A1 | 5/2007 | Smith et al. | |
| 2007/0277651 A1 | 12/2007 | Calnan et al. | |
| 2008/0069854 A1* | 3/2008 | Xiao | A61L 27/306 |
| | | | 424/423 |
| 2009/0301788 A1 | 12/2009 | Stevens et al. | |
| 2009/0301789 A1 | 12/2009 | Smith et al. | |
| 2010/0038147 A1 | 2/2010 | Lockstedt et al. | |
| 2010/0044115 A1 | 2/2010 | Mirchandani | |
| 2010/0193254 A1 | 8/2010 | Lind et al. | |
| 2011/0030440 A1 | 2/2011 | Keane et al. | |
| 2011/0142707 A1 | 6/2011 | Choe et al. | |
| 2011/0256013 A1 | 10/2011 | Yamamoto et al. | |
| 2012/0040183 A1 | 2/2012 | Kelkar | |
| 2012/0151846 A1 | 6/2012 | Wan | |
| 2012/0247840 A1 | 10/2012 | Vempati et al. | |
| 2012/0292053 A1 | 11/2012 | Xu et al. | |
| 2012/0292063 A1 | 11/2012 | Forster et al. | |
| 2013/0048271 A1 | 2/2013 | VanLue | |
| 2013/0068539 A1 | 3/2013 | Vempati et al. | |
| 2013/0303356 A1 | 11/2013 | Smith et al. | |
| 2013/0313403 A1 | 11/2013 | Atkins et al. | |
| 2013/0316149 A1 | 11/2013 | Atkins et al. | |
| 2013/0320598 A1 | 12/2013 | Atkins et al. | |
| 2013/0333950 A1 | 12/2013 | Atkins et al. | |
| 2014/0087210 A1 | 3/2014 | Keane et al. | |
| 2014/0298728 A1 | 10/2014 | Keshavan | |
| 2015/0129316 A1 | 5/2015 | Harrington et al. | |
| 2015/0283614 A1 | 10/2015 | Wu et al. | |
| 2015/0354284 A1 | 12/2015 | Griffo et al. | |
| 2016/0039006 A1 | 2/2016 | Amstutz et al. | |
| 2016/0053550 A1 | 2/2016 | Wilson et al. | |
| 2016/0067780 A1 | 3/2016 | Zediker | |
| 2016/0076342 A1 | 3/2016 | Silva | |
| 2016/0082667 A1 | 3/2016 | Donderici | |
| 2016/0084083 A1 | 3/2016 | Hice et al. | |
| 2016/0088870 A1 | 3/2016 | Langeland | |
| 2016/0138343 A1 | 5/2016 | Collins et al. | |
| 2016/0138362 A1 | 5/2016 | Dockweiler | |
| 2016/0177637 A1 | 6/2016 | Fleckenstein et al. | |
| 2016/0185009 A1 | 6/2016 | Keshavan et al. | |
| 2016/0201425 A1 | 7/2016 | Walton et al. | |
| 2016/0207109 A1 | 7/2016 | Buller et al. | |
| 2016/0222798 A1 | 8/2016 | Snyder et al. | |
| 2016/0258223 A1 | 9/2016 | Uhlenberg et al. | |
| 2016/0258242 A1 | 9/2016 | Hayter et al. | |
| 2016/0258298 A1 | 9/2016 | Channel et al. | |
| 2016/0288200 A1 | 10/2016 | Xu et al. | |
| 2016/0312567 A1 | 10/2016 | Murphree et al. | |
| 2016/0325348 A1 | 11/2016 | Ownby et al. | |
| 2016/0332236 A1 | 11/2016 | Stoyanov | |
| 2016/0375493 A1 | 12/2016 | Stoyanov et al. | |
| 2017/0037518 A1 | 2/2017 | Oxford et al. | |
| 2017/0050241 A1 | 2/2017 | Thomas et al. | |
| 2017/0072465 A1 | 3/2017 | Welch et al. | |
| 2017/0072469 A1 | 3/2017 | Maderud et al. | |
| 2017/0087622 A1 | 3/2017 | Cook, III et al. | |
| 2017/0100771 A1 | 4/2017 | Voglewede et al. | |
| 2017/0101835 A1 | 4/2017 | Webster et al. | |
| 2017/0101836 A1 | 4/2017 | Webster et al. | |
| 2017/0107764 A1 | 4/2017 | Cook, III et al. | |
| 2017/0173696 A1 | 6/2017 | Sheinman | |
| 2017/0342779 A1 | 11/2017 | Cook, III | |
| 2017/0369382 A1 | 12/2017 | Billotte Cabre et al. | |
| 2018/0236687 A1 | 8/2018 | Prichard et al. | |
| 2018/0250744 A1 | 9/2018 | Symeonidis et al. | |
| 2018/0250775 A1 | 9/2018 | Spink et al. | |
| 2018/0361477 A1 | 12/2018 | Morimoto et al. | |
| 2019/0084047 A1 | 3/2019 | Lehto et al. | |
| 2019/0168299 A1 | 6/2019 | Prichard et al. | |
| 2019/0211424 A1 | 7/2019 | De Flon | |
| 2020/0218876 A1 | 7/2020 | Park et al. | |
| 2021/0114123 A1 | 4/2021 | Fang et al. | |

FOREIGN PATENT DOCUMENTS

| | | | |
|---|---|---|---|
| CN | 1531470 A | 9/2004 | |
| CN | 101142416 A | 3/2008 | |
| CN | 101148747 A | 3/2008 | |
| CN | 101153363 A | 4/2008 | |
| CN | 101356340 A | 1/2009 | |
| CN | 101588884 A | 11/2009 | |
| CN | 201416393 Y | 3/2010 | |
| CN | 101721857 A | 6/2010 | |
| CN | 102363876 A | 2/2012 | |
| CN | 102489707 A | 6/2012 | |
| CN | 103060589 A | 4/2013 | |
| CN | 103962561 A | 8/2014 | |
| CN | 104321501 A | 1/2015 | |
| CN | 104588650 A | 5/2015 | |
| CN | 104858430 A | 8/2015 | |
| CN | 104903029 A | 9/2015 | |
| CN | 105648383 A | 6/2016 | |
| CN | 105840106 A | 8/2016 | |
| CN | 105848812 A | 8/2016 | |
| CN | 205805420 U | 12/2016 | |
| CN | 106491247 A | 3/2017 | |
| CN | 106493371 A | 3/2017 | |
| CN | 106780724 | 5/2017 | |
| CN | 107107187 A | 8/2017 | |
| CN | 107374760 A | 11/2017 | |
| CN | 109865838 A | 6/2019 | |
| DE | 102016108507 A1 | 11/2016 | |
| EP | 0545718 A2 * | 6/1993 | ............ B22F 3/1109 |
| EP | 0545718 A2 | 6/1993 | |
| EP | 0864661 A1 | 9/1998 | |
| EP | 1518622 A1 | 3/2005 | |
| EP | 2465960 A1 | 6/2012 | |
| EP | 2690196 A1 | 1/2014 | |
| EP | 3409801 A1 | 12/2018 | |
| JP | H1088311 A | 4/1998 | |
| JP | 2002356328 A | 12/2002 | |
| JP | 2005171299 A | 6/2005 | |
| JP | 2005171299 A * | 6/2005 | ............ B22F 3/1055 |
| KR | 20160146729 A | 12/2016 | |
| WO | 2006093403 A1 | 9/2006 | |
| WO | WO2007127899 A2 | 11/2007 | |
| WO | WO2011008439 A2 | 1/2011 | |
| WO | WO2011149401 A1 | 12/2011 | |

(56) References Cited

FOREIGN PATENT DOCUMENTS

| WO | 2015073081 A1 | 5/2015 |
| WO | WO2015162206 A2 | 10/2015 |
| WO | WO2016066934 | 4/2016 |
| WO | WO2016076853 | 5/2016 |
| WO | WO2016085452 | 6/2016 |
| WO | WO2016094704 A1 | 6/2016 |
| WO | WO2016112169 | 7/2016 |
| WO | WO2016148724 A1 | 9/2016 |
| WO | WO2016171711 A1 | 10/2016 |
| WO | WO2016176221 | 11/2016 |
| WO | WO2017011825 | 1/2017 |
| WO | WO2017039619 | 3/2017 |
| WO | WO2017069744 | 4/2017 |

OTHER PUBLICATIONS

Murr et al., Fabricating Functional Ti-Alloy Biomedical Implants by Additive Manufacturing Using Electron Beam Melting, 2012, URL: <https://www.omicsonline.org/fabricating-functional-tialloy-biomedical-implants-by-additive-manufacturing-using-electron-beam-melting.pdf>, entire document (Year: 2012).*
Nag et al., "Fundamentals of Medical Implant Materials," 2012, ASM Handboo, vol. 23, URL: <https://www.asminternational.org/documents/10192/1849770/05285G_Sample.pdf>, pp. 6-17 (Year: 2012).*
Jasty et al., "Comparison of bone ingrowth into cobalt chrome sphere and titanium fiber mesh porous coated cementless canine acetabular components," 1993, URL: <https://onlinelibrary.wiley.com/doi/epdf/10.1002/jbm.820270511>, pp. 639-644 (Year: 1993).*
Kakiuchi et al, JP 2005171299A Google Patents machine translation printed on Sep. 12, 2023, Jun. 30, 2005, entire translation (Year: 2005).*
Laoui, T. et al., Influence of powder parameters on selective laser sintering of tungsten carbide.
Davis, E.A., An Introduction to Metal Matrix Composites.
Dec. 20, 2019 Final OA.
Oct. 7, 2019 Non-Final OA.
Aug. 22, 2019 Advisory Action Received.
Aug. 13, 2019 Non-Final OA.
May 6, 2019 Final OA.
Dec. 17, 2018 Non-Final OA.
Jun. 25, 2018 Advisory Action Received.
Aug. 22, 2017 Advisory Action.
Wang et al., "Direct Selective Laser Sintering of Hard Metal Powders," Advanced Manufacturing Technology, vol. 19, pp. 351-357.
Kelley, III, Andrew, Tungsten Carbide-Cobalt by Three Dimensional Printing, 1996.
May 31, 2018 International Search Report Transmitted.
Apr. 4, 2018 Final Office Action 2.
Nov. 13, 2017 Office action (3 months) 2.
Apr. 4, 2017 Final Office Action.
Nov. 28, 2016 Office action (3 months) 1.
Belter et al., "Strengthening of 3D Printed Fused Deposition Manufactured Parts Using the Fill Compositing Technique", PLOS One, 2015.
Clausen et al., "Exploiting Additive Manufacturing Infill in Topology Optimization for Improved Buckling Load", Engineering, 2 (2016), p. 250-257.
Kruth et al., "Consolidation phenomena in laser and powder-bed based layered manufacturing", CIRP Annals-Manufacturing Technology, 56 (2007), p. 730-759.
Wu et al., "Minimum Compliance Topology Optimization of Shell-Infill Composites for Additive Manufacturing", Computer Methods in Applied Mechanics and Engineering, 2017.
Feb. 27, 2020 Advisory Action Received.
Jan. 30, 2020 Final OA.
Jan. 16, 2020 Foreign OA.
Dec. 24, 2019 Exam Notice.
Das et al., Producing Metal Parts with Selective Laser Sintering/Hot Isostatic Pressing, JOM, 50 (12) (1998), pp. 17-20.
Mar. 17, 2020 Office action.
Yun Bai et al., Effect of Particle Size Distribution on Powder Packing and Sintering in BinderJetting Additive Manufacturing of Metals. Journal of Manufacturing Science and Engineering, Jan. 6, 2017, vol. 139.
Apr. 1, 2020 Search Report.
May 13, 2020 Office Action.
Dec. 4, 2020 Office Action (non-US) CN App. No. 110199043.
Feb. 8, 2021 Office Action (non-US) ES App. No. 2732648.
Productivity enhancement of laser powder bed fusion using.
Oct. 14, 2020 Final Office Action (US Only) US App. No. 20180236687A1.
Jul. 21, 2020 Final Office Action (US Only) US App. No. 20190084290A1.
Jun. 15, 2020 Office action (3 months) (US Only) US App. No. 20180236687A1.
Design and characterisation of food grade powders and inks for microstructure co.
Jun. 3, 2021 Notification date 18(3) GB App. No. 2573445.
May 21, 2021 Office Action (non-US) CN App. No. 109630027A.
Mar. 17, 2021 Notice of Allowance US App. No. 20190084290A1.
Mar. 15, 2021 Notice of Allowance US App. No. 20180236687A1.
Jan. 27, 2021 Advisory Action (PTOL-303) 1 US App. No. 20180236687A1.
Holland et al., "Design and characterisation of food grade powders and inks for microstructure control using 3D printing", Journal of Food Engineering, 220, 2018, pp. 12-19, Elsevier Ltd.
Yang et al., "Influence of powder properties on rapid prototyping by electron beam selective melting", Rare Metal Materials and Engineering, Sep. 30, 2007, pp. 574-577, vol. 36, supplement 3.
Yan et al., "3D Printing-Creativity Changes Lives", Xidian University Press, Oct. 31, 2016, p. 1.
Aug. 31, 2021 Office Action (non-US) SE App. No. 1950947-0.
Jul. 29, 2021 Office Action (non-US) DE App. No. 102018122536A1.
Jul. 5, 2021 Office Action (non-US) ES App. No. 2732648.
Sep. 3, 2021 Office Action (non-US) CN Appl 201880007874.6.
Jan. 18, 2022 Office Action (non-US) CN App. No. 109630027A.
Jan. 6, 2022 Foreign OA—CN App. No. 201880007874.6.
Nov. 16, 2021 Foreign OA—JP App. No. 2019542515.
Nov. 8, 2021 Notice of Allowance—GB App. No. 1909911.8.
Jul. 14, 2020 Search Report International Publication WO App. No. 2020198245.
Jan. 5, 2022 Foreign OA—CN App. No. 201811311707.9 English Translation.
May 31, 2022 Office Action (non-US) KR No. 2019111027.
Apr. 22, 2022 Notice of Allowance CN No. 109630027A.
Mar. 22, 2022 Office Action (non-US) JP No. 2019542515.
Apr. 7, 2022 Office Action (non-US) CN No. 110199043.
Mar. 28, 2022 Office Action (non-US) ES No. 2732648.
Sep. 28, 2020 Advisory Action Received—US No. 16196846.
Mar. 18, 2020 Notice of Allowance.
Aug. 8, 2018 Notice of Allowance.
Aug. 9, 2019 Non-Final Office Action U.S. Appl. No. 16/056,634, 15 pages.
Apr. 23, 2020 Notice of Allowance U.S. Appl. No. 15/727,307, 7 pages.
Jan. 5, 2022 Foreign Office Action CN Application No. 201811311707.9, English Translation, 10 pages.
Hashe N.G., et al., "Characterization of WC-(W,V)C-Co Made from Pre-Alloyed (W,V)C," International Journal of Refractory Metals and Hard Materials, Elsevier, Amsterdam, NL, Mar. 1, 2009, vol. 27, No. 2, ISSN 0263-4368, pp. 229-233, DOI:10.1016/j.ijrmhm.2008.09.020, XP025937878.
International Preliminary Report on Patentability for International Application No. PCT/US2018/018553, dated Aug. 29, 2019, 14 Pages.
International Preliminary Report on Patentability for International Application No. PCT/US2020/024495, dated Oct. 7, 2021, 6 Pages.
International Search Report and Written Opinion for International Application No. PCT/US2018/018553, dated May 31, 2018, 15 Pages.

(56) References Cited

OTHER PUBLICATIONS

Kernan B.D., et al., "Three-Dimensional Printing of Tungsten Carbide-10wt% Cobalt Using a Cobalt Oxide Precursor," International Journal of Refractory Metals and Hard Materials, Elsevier, Amsterdam, NL, Jan. 1, 2007, vol. 25, No. 1, 2 pages, DOI:10.1016/j.ijrmhm.2006.02.002, ISSN 0263-4368, XP005719849.

Tan D., et al., "Kinesin-13s form Rings Around Microtubules," The Journal of Cell Biology, Oct. 9, 2006, vol. 175, No. 1, Figure. 4, pp. 25-31.

Dec. 2, 2022 Foreign Office Action German Application No. 102018128370.9,12pages.

Dec. 26, 2022 Foreign Office Action Korean Application No. 1020197021387, 11 pages.

Dec. 27, 2022 Foreign Office Action Chinese Application No. CN201811311707.9, 12 pages.

Jun. 16, 2022 Office Action (non-US) CN App. No. 109865838A.

Takahash G., "Sample Preparation for X-ray Fluorescence Analysis," Rigaku Journal, 2015, vol. 31(1), pp. 26 to 30.

Mar. 13, 2023 Non-Final Office Action U.S. Appl. No. 16/828,657, 8 Pages.

Jul. 22, 2023 Foreign Office Action Chinese Application No. CN202080021887.6, 14 Pages.

Jan. 19, 2023 Foreign Office Action Chinese Application No. CN202080021887.6, 14 Pages.

Jul. 21, 2023 Foreign Office Action Sweden Application No. 1950947-0, 4 pages.

Oct. 5, 2023 Final Office Action U.S. Appl. No. 16/828,657, 10 Pages.

Nov. 29, 2023 Foreign Office Action Korean Application No. KR20237035527, 6 Pages.

Dec. 15, 2023 Advisory Action Received U.S. Appl. No. 16/828,657, 3 Pages.

Aug. 29, 2023 Foreign Office Action German Application No. DE20181100911 (Pub. No. DE112018000911T5), 8 Pages.

\* cited by examiner

ADDITIVE MANUFACTURING TECHNIQUES AND APPLICATIONS THEREOF

FIELD

The present invention relates to additive manufacturing techniques and, in particular, to additive manufacturing techniques providing enhancements to article density before and after sintering.

BACKGROUND

Additive manufacturing generally encompasses processes in which digital 3-dimensional (3D) design data is employed to fabricate an article or component in layers by material deposition and processing. Various techniques have been developed falling under the umbrella of additive manufacturing. Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of mold lubricants and coolant. Most importantly, additive manufacturing enables significant freedom in article design. Articles having highly complex shapes can be produced without significant expense, allowing the development and evaluation of a series of article designs prior to final design selection.

However, challenges remain with several additive manufacturing techniques. The binder jetting process, for example, requires post-sintering processes to consolidate the printed article to a dense finished product. Final density of the product is a result of several variables, including green density of the printed article. The green density reflects powder packing efficiency and contact proximity of adjacent particles. Smaller particles with higher surface area, higher contact points and short diffusion distances serve to enhance the densification process during sintering. Nevertheless, in powder bed methods, a practical limitation exists of powder size that is both cost effectively manufactured and easily spread into a continuous layer. Moreover, fine particles tend to cake or agglomerate, thereby developing a lower apparent density. In view of these technical considerations, enhancements are required for improving particle interaction and packing efficiency in additive manufacturing techniques.

SUMMARY

In one aspect, methods of making articles are described herein employing additive manufacturing techniques providing enhancements to article density before and after sintering. Briefly, a method of making a sintered article comprises providing a composite article including a porous exterior printed from a powder composition via one or more additive manufacturing techniques, the porous exterior defining an interior volume and providing a loose powder component in the interior volume. The porous exterior and loose powder component are simultaneously sintered to provide the sintered article comprising a sintered interior and sintered exterior. In some embodiments, a density and/or porosity gradient exists between the sintered interior and the sintered exterior. In another aspect, articles formed according to methods described herein are provided.

In another aspect, sintered articles are described herein. A sintered article, in some embodiments, comprises a sintered interior and a sintered exterior, the sintered exterior forming less than 30 volume percent of the sintered article, wherein a density and/or porosity gradient exists between the sintered interior and sintered exterior.

These and other embodiments are further described in the following detailed description.

DETAILED DESCRIPTION

Figure 1:
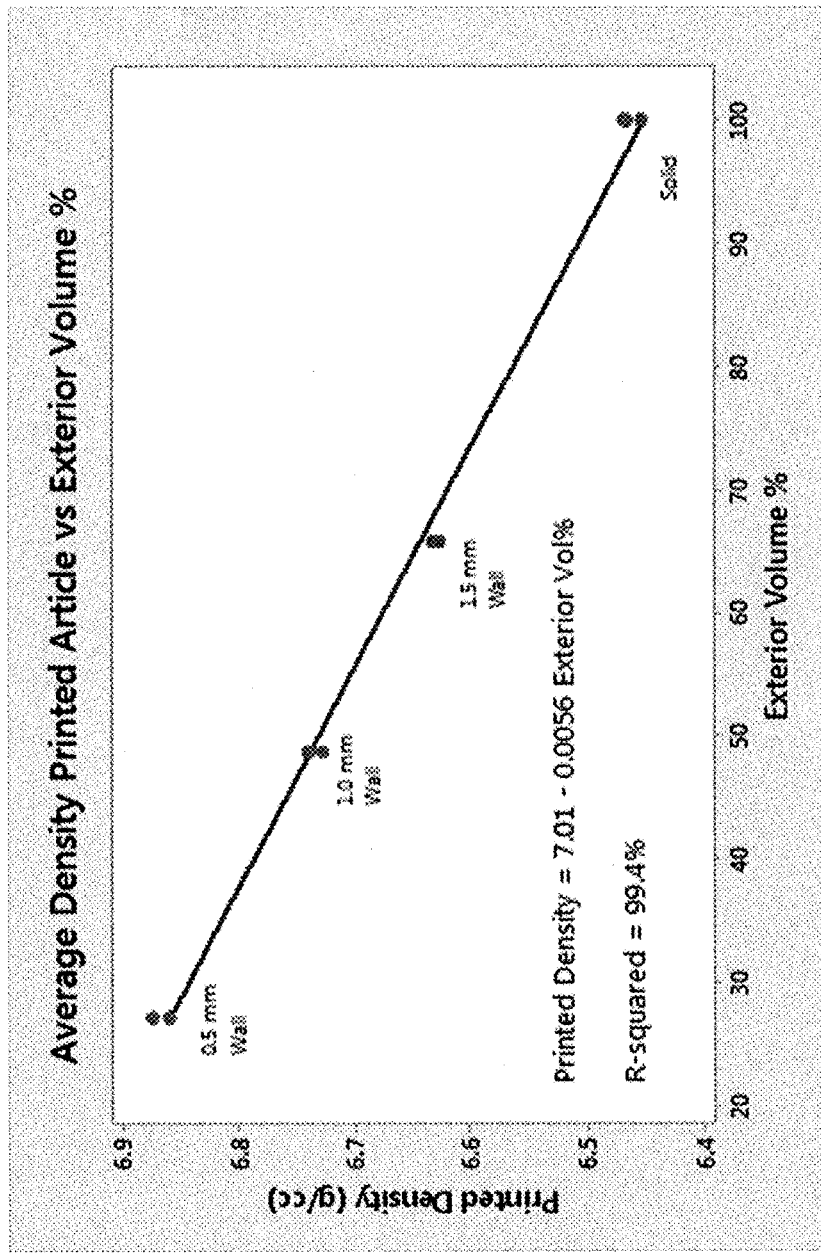
FIG. 1 illustrates a linear relationship between average density of the composite article and exterior volume percent according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Methods of Making Sintered Articles

In one aspect, a method of making a sintered article comprises providing a composite article comprising a porous exterior printed from a powder composition via one or more additive manufacturing techniques, the porous exterior defining an interior volume and providing a loose powder component in the interior volume. The porous exterior and loose powder component are simultaneously sintered to provide the sintered article comprising a sintered interior and sintered exterior. Turning now to specific steps, the porous exterior is printed from a powder composition via one or more additive manufacturing techniques. Notably, in being porous, the exterior can comprise powder consolidated by binder. Pores formed by interparticle spacing in the exterior can be partially or completely filled with the binder. In some embodiments, for example, the porous exterior is formed in a binder jetting or binder printing additive manufacturing technique. Any suitable binder can be used in the binder jetting process, including one or more organic binders. Binders can be selected according to several considerations including, but not limited to, compositional identity of the powder, flowability and curing characteristics of the binder and desired green strength of the article exterior. In other embodiments, the porous exterior can be formed of lightly sintered powder, such that the porous exterior has greater than 50 percent porosity. In some embodiments, sintered powder forming the porous exterior has greater than 60 percent porosity or greater than 70 percent porosity. A porous exterior comprising sintered powder, for example, can be produced by selective laser sintering (SLS) or selective laser melting (SLM), wherein laser power can be reduced and/or scan speed increased to partially sinter the powder composition, resulting in high porosity.

In some embodiments, the porous exterior forms less than 60 volume percent of the composite article. Volume percent of the composite article formed by the porous exterior can also have a value selected from Table I.

TABLE I

| Composite Article vol. % formed by Porous Exterior |
|---|
| ≤50 |
| ≤40 |
| ≤30 |
| ≤25 |
| ≤20 |
| ≤15 |
| ≤10 |
| 5-50 |
| 5-40 |
| 5-30 |
| 5-20 |
| 10-30 |
| 10-20 |

As described herein, the porous exterior defines an interior volume comprising a loose powder component. In being in the loose state, the powder component is free-flowing and is not restricted by the presence of binder. The porous exterior can serve as one or more walls defining an interior of the composite article in which the loose powder component is positioned. Arrangement of exterior walls defining the interior volume is dependent on design parameters specific to the article. For example, if the composite article is a hollow cylinder, a porous inner diameter (ID) wall and porous outer diameter (OD) wall can be formed via one or more additive manufacturing techniques. The porous ID and OD walls define a volume between the walls comprising a loose powder component.

The loose powder component and the powder composition of the porous exterior can have the same or substantially the same composition, in some embodiments. Alternatively, the loose powder component and the powder composition of the porous exterior are of differing compositions. The loose powder component and powder composition of the porous exterior can be independently selected from the group consisting of powder metal and powder alloy. Powder metal can comprise aluminum or any transition metal including, but not limited to, metals of Groups IVB-VIIIB of the Periodic Table. Powder metal can also comprise a transition metal selected from Groups IB and IIB of the Periodic Table. Groups of the Periodic Table described herein are identified according to the CAS designation.

Powder alloy of the porous exterior and/or loose powder component, in some embodiments, comprises cobalt-based alloy, nickel-based alloy or iron-based alloy. Cobalt-based powder alloy is commercially available under the STEL-LITE®, HAYNES®, and/or TRIBALOY® trade designations. Moreover, nickel-based powder alloy is commercially available under the INCONEL®, HASTELLOY® and/or BALCO® trade designations for some embodiments.

Alternatively, the loose powder component and/or powder composition of the porous exterior comprises metal carbide grains. In some embodiments, for example, metal carbide grains comprise tungsten carbide. Metal carbide grains can also include carbides of one or more of niobium, vanadium, tantalum, chromium, zirconium and/or hafnium in addition to tungsten carbide.

In some embodiments, metal carbide of the loose powder component and/or exterior powder composition are sintered cemented carbide particles. As detailed further herein, an individual sintered cemented carbide particle comprises multiple metal carbide grains sintered together in conjunction with metallic binder. In the loose condition, the sintered cemented carbide particles can have apparent density of at least 6 g/cm$^3$, in some embodiments. As known to one of skill in the art, apparent density is the mass of a unit volume of powder or particles in the loose condition, usually expressed in g/cm$^3$. In some embodiments, sintered cemented carbide particles have apparent density of at least 7 g/cm$^3$. Apparent density of sintered cemented carbide particles of grade powders described herein can also have values selected from Table II.

TABLE II

| Apparent Density of Sintered Cemented Carbide Particles |
|---|
| ≥6.5 g/cm$^3$ |
| ≥7.5 g/cm$^3$ |
| ≥8 g/cm$^3$ |
| ≥9 g/cm$^3$ |
| 6-11 g/cm$^3$ |
| 7-11 g/cm$^3$ |
| 8-11 g/cm$^3$ |

Apparent density of sintered cemented carbide particles of grade powders can also be less than 6 g/cm$^3$. For example, apparent density of sintered cemented carbide particles can range from 2-6 g/cm$^3$, in some embodiments. Apparent density of sintered cemented particles can be determined according to ASTM B212 Standard Test Method for Apparent Density of Free-Flowing Metal Powders using the Hall Flowmeter Funnel.

In addition to apparent density, sintered cemented carbide particles employed in the composite article can have tap density of at least 7 g/cm$^3$. In some embodiments, sintered cemented carbide particles exhibit tap density having a value selected from Table III.

TABLE III

| Tap Density of Sintered Cemented Carbide Particles |
|---|
| ≥7.5 g/cm$^3$ |
| ≥8 g/cm$^3$ |
| ≥8.5 g/cm$^3$ |
| ≥9.5 g/cm$^3$ |
| 7-12 g/cm$^3$ |
| 8-12 g/cm$^3$ |
| 9-12 g/cm$^3$ |

Tap density of sintered cemented carbide particles, powder metal and/or powder alloy can be determined according to ASTM B527 Standard Test Method for Tap Density of Metal Powders and Compounds. In some embodiments, the ratio of tap density to apparent density (Hausner ratio) of sintered cemented carbide particles is 1.05 to 1.50. Hausner ratio of sintered cemented carbide particles, in some embodiments is 1.1 to less than 1.50.

In addition to apparent density and tap density, sintered cemented carbide particles can have an average individual particle density of at least 80 percent theoretical density. In some embodiments, average individual particle density of the sintered cemented carbide particles is at least 90 percent or at least 95 percent theoretical density. Sintered cemented carbide particles can exhibit an average individual particle density of 80 to 95 percent theoretical density, in some embodiments. In further embodiments, sintered cemented carbide particles can exhibit an average individual particle density of 90 to 98 percent theoretical density.

As described further herein, the foregoing apparent densities, tap densities and individual particle densities can be achieved through one or several sintering processes administered during formation of the particles. The sintering processes, in some embodiments, do not employ sintering inhibitor(s) to mitigate particle sticking or adhesion. Sintered cemented carbide particle properties described herein can be achieved in the absence of sintering inhibitor(s). In some embodiments, sintered cemented carbide particles are prepared by sintering a grade powder at temperatures of 1100° C. to 1400° C. for 0.5 to 2 hours to provide a sintered compact. The sintered compact is subsequently milled to provide individual sintered cemented carbide particles. Depending on particle morphology and density, the sintered cemented carbide particles can be further heat treated for further densification. Further heat treatment can include plasma densification, such as plasma spheroidization using an RF plasma torch or DC plasma torch. Alternatively, the sintered cemented carbide particles can be re-sintered forming a second compact. The second compact is milled to provide the sintered cemented carbide particles. Further densification treatments can be administered any desired number of times to provide sintered cemented carbide particles desired apparent densities, tap densities and/or individual particle densities. Sintering times and temperatures can be selected according to several considerations including, but not limited to, binder content of the cemented carbide particles, desired sintered particle density and sintering stage. In some embodiments, early sintering stages are conducted at lower temperatures and/or shorter times to facilitate milling the sintered compact. For example, an initial or early stage sintering process may be administered at temperatures below binder liquefaction. Late stage or final sintering processes may achieve higher temperatures, such as temperatures at which liquid phase sintering takes place.

Alternatively, sintered cemented carbide particles have been developed for unrelated applications, such as thermal spray and other cladding applications. In some embodiments, sintered cemented carbide particles commercially available for these unrelated applications may be employed in the loose powder component and/or composite article exterior described herein. Sintered cemented carbide particles developed for thermal spray/cladding applications, for example, are commercially available from Global Tungsten and Powders Corporation under the Powder Perfect trade designation.

Sintered cemented carbide particles can generally have an average size of 1 μm to 100 μm. In some embodiments, sintered cemented carbide particles have an average size selected from Table IV.

TABLE IV

| Average Sintered Cemented Carbide Particle Size (μm) |
| --- |
| 5-90 |
| 5-50 |
| 10-75 |
| 10-50 |
| 5-40 |
| 20-40 |
| 0.5-2 |
| 1-5 |
| 1-10 |

Sintered cemented carbide particles can exhibit a Gaussian particle size distribution, in some embodiments. In other embodiments, sintered cemented carbide particles can have a polydisperse, bimodal or multi-modal particle size distribution. In further embodiments, sintered cemented carbide particles can be monodisperse or substantially monodisperse. In being substantially monodisperse, the cemented carbide particles are within +10 percent or +5 of the average particle size. In some embodiments, sintered cemented carbide particles are spherical or substantially spherical in shape. Alternatively, sintered cemented carbide particles can be a mixture of irregularly shaped particles with spherical or substantially spherical particles.

Sintered cemented carbide particles comprise one or more metal carbides selected from the group consisting of Group IVB metal carbides, Group VB metal carbides and Group VIB metal carbides. In some embodiments, tungsten carbide is the sole metal carbide of the sintered particles. In other embodiments, one or more Group IVB, Group VB and/or Group VIB metal carbides are combined with tungsten carbide to provide individual sintered particles. For example, chromium carbide, titanium carbide, vanadium carbide, tantalum carbide, niobium carbide, zirconium carbide and/or hafnium carbide and/or solid solutions thereof can be combined with tungsten carbide in sintered particle production. Tungsten carbide can generally be present in the sintered particles in an amount of at least about 80 or 85 weight percent. In some embodiments, Group IVB, VB and/or VIB metal carbides other than tungsten carbide are present in the sintered particles in an amount of 0.1 to 5 weight percent.

Sintered cemented carbide particles comprise metallic binder. Metallic binder of sintered cemented carbide particles can be selected from the group consisting of cobalt, nickel and iron and alloys thereof. In some embodiments, metallic binder is present in the sintered cemented carbide particles in an amount of 0.1 to 35 weight percent. Metallic binder can also be present in the sintered cemented carbide particles in an amount selected from Table V.

TABLE V

| Metallic Binder Content (wt. %) |
| --- |
| 0.1-20 |
| 0.1-10 |
| 0.5-15 |
| 1-10 |
| 3-20 |
| 5-15 |
| 12-15 |
| 10-35 |
| 15-35 |
| 15-25 |

Metallic binder of the sintered cemented carbide particles can also comprise one or more additives, such as noble metal additives. In some embodiments, the metallic binder can comprise an additive selected from the group consisting of platinum, palladium, rhenium, rhodium and ruthenium and alloys thereof. In other embodiments, an additive to the metallic binder can comprise molybdenum, silicon or combinations thereof. Additive can be present in the metallic binder in any amount not inconsistent with the objectives of the present invention. For example, additive(s) can be present in the metallic binder in an amount of 0.1 to 10 weight percent of the sintered cemented carbide particles.

As detailed further herein, portions of the composite article formed by additive manufacturing are largely limited to the porous exterior, wherein the loose powder component of the interior completes the remainder of the composite article. In this way, the loose powder component forms the bulk of the composite article and is spatially free to pack in the most efficient manner. In some embodiments, the loose powder component can be vibrated and/or subjected to mechanical agitation to further enhance packing characteristics and higher green densities. In contrast, the powder composition of the printed exterior exhibits limited freedom of movement due to presence of the organic binder or partial sintering. Accordingly, the exterior exhibits pores and/or other powder packing inefficiencies. As a result of these packing inefficiencies, volume of the composite article occupied by the porous exterior is minimized. In some embodiments, the porous exterior is limited to a volume percent selected from Table I above. Moreover, the porous exterior can exhibit thickness of less than 1.5 mm. Thickness of the porous exterior can also have a value selected from Table VI.

TABLE VI

| Porous Exterior Thickness (mm) |
| --- |
| ≤1.25 |
| ≤1 |
| ≤0.75 |
| ≤0.5 |
| 0.1-1 |
| 0.5-1.5 |
| 0.05-0.5 |

Additionally, the interior volume defined by the porous exterior can have any desired dimensions. Dimensions of the interior volume can be selected according to the particular design of the composite article. In some embodiments, the interior volume has at least one dimension greater than 200 μm. In some embodiments, one or more dimensions of the interior volume have a value selected from Table VII.

TABLE VII

| Interior Volume Dimension (mm) |
| --- |
| ≥0.5 |
| ≥0.75 |
| ≥1 |
| ≥5 |
| 0.5-1000 |
| 1-1000 |
| 5-5000 |

The interior volume can have any desired shape, including polygonal, spherical, elliptical and any combination of straight and curved surfaces.

In some embodiments, the porous exterior can exhibit a binder gradient through the exterior thickness. For example, binder content can decrease along exterior thickness or cross-section in a direction toward the interior volume. Lower binder content adjacent to the loose powder component can enable closer green density matching between the porous exterior and the loose powder component. Closer green density matching can mitigate sintering shrinkage between the loose powder component and exterior, thereby reducing cracking and other stresses that can compromise structural integrity of the sintered article. In other embodiments, the porous exterior can exhibit a sintering gradient along the exterior thickness. The porous exterior may exhibit less sintering and higher porosity adjacent to the loose powder component. Sintered density may increase in the porous exterior in a direction moving away from the interior volume. Accordingly, the sintered porous exterior can exhibit a density gradient. A density gradient in the porous exterior may also be produced by the binder gradient described above.

Minimization of the porous exterior thickness can enhance or increase density of the composite article. Average density of the composite article, for example, can be at least 50 percent tap density of the loose powder component. In some embodiments, average density of the composite article is at least 55 percent tap density of the loose powder component. In further embodiments, average density of the composite article is 50-70 percent tap density of the loose powder component. Average density includes density of the porous exterior and the loose powder component.

Notably, in some embodiments, volume percent of the porous exterior can exhibit a linear relationship with average density of the composite article. For example, average density of the composite article can increase linearly with decreasing volume percent of the porous exterior. FIG. 1 illustrates a linear relationship between average density of the composite article printed by an additive manufacturing technique and exterior volume percent according to some embodiments. Sintered cemented carbide particles described above were employed in the porous exterior and the loose powder component of the printed composite article to generate the data of FIG. 1.

In some embodiments, the porous exterior is formed around the loose powder component by one or more additive manufacturing techniques. Formation of the exterior around the loose powder component can enable complete production of the composite article at the conclusion of the additive manufacturing process. The resulting composite article can be subjected to one or more post-formation steps, including curing of the binder in the porous exterior. Binder curing can enhance green strength of the exterior for handling prior to the sintering process. Strength of the composite article can also be enhanced via one or more printed infill structures spanning the interior volume defined by the porous exterior. Infill structures can have any design consistent with enhancing strength of the composite article. In some embodiments, one or more lattice structures span the interior volume. Specific design and placement of infill structures can be dependent on particular design parameters and strength requirements of the composite article. Infill structures can be uniform or substantially uniform in design and/or placement in the interior volume, in some embodiments. In other embodiments, infill structures can vary in design and/or placement in the interior volume. For example, size of the interior volume may vary over the article requiring variable sizes of infill structural elements. Infill structures can assist in reducing exterior wall thickness and the volume occupied by the porous exterior. Dimensions of the infill structures, including lattice structures, can be selected such that the structures blend into the sintered interior and are, therefore, not discernable from the remainder of the sintered interior formed by the loose powder component. In other embodiments, infill structure(s) remain discernable in the sintered interior of the sintered article. Infill structures can be formed by the additive manufacturing techniques employed in fabrication of the porous exterior.

In some embodiments, the porous exterior is formed by the additive manufacturing process, and the loose powder component is subsequently added to the interior volume defined by the exterior. When formed separately or independently of the loose powder component, the porous exterior can be cured or subjected to other processing techniques prior to addition of the loose powder to the interior volume.

Curing binder of the porous exterior can enhance green strength of the porous exterior. In some embodiments, the porous exterior can be lightly sintered to brown-sintered prior to addition of the loose powder component.

Once formed, the composite article is subjected to one or more sintering processes to provide the sintered article. The porous exterior and loose powder component are simultaneously sintered or co-sintered, thereby forming a sintered interior and sintered exterior of the article. Sintering times and temperatures can be selected according to several considerations including, but not limited to, compositional identity of the exterior and loose powder component, dimensions of the composite article and desired strength of the sintered article. In some embodiments, the sintered article can be subjected to hot isostatic pressing (HIP). HIP can be administered during or subsequent to the sintering process. Alternatively, desired density of the sintered article can be achieved without a HIP cycle.

The sintered interior and sintered exterior of the article can be continuous with one another. Moreover, a density gradient can exist between the sintered interior and sintered exterior. The sintered interior can exhibit a higher density than the sintered exterior. The sintered interior, for example, can be at least 97 percent theoretical density. In some embodiments, the sintered interior is at least 98 percent or at least 99 percent theoretical density. As described herein, the higher density of the loose powder component can facilitate higher sintered densities. In some embodiments, the foregoing density values of the sintered interior can be achieved in the absence of HIP. In comparison, the sintered exterior can exhibit lower density. The sintered exterior, in some embodiments, is 92 to 95 percent theoretical density. Lower density of the composite article induced by the presence of the binder in the porous exterior can induce porosity that is difficult to close in the sintering process. Unlike the sintered interior, porosity of the sintered exterior can be interconnected porosity that is resistant to complete closure during sintering and/or HIPing. Isolated pores of the interior are more readily closed in sintering operations. Accordingly, a porosity gradient can also exist between the sintered interior and the sintered exterior. In some embodiments, the sintered interior exhibits less than 2 volume percent or less than 1 volume percent porosity. The sintered exterior can exhibit 3-10 volume percent porosity, in some embodiments. Methods described herein can further comprise grinding or mechanically removing at least a portion of the sintered exterior. The sintered exterior, in some embodiments, is completely removed from the sintered article leaving behind the sintered interior.

Figure 2:
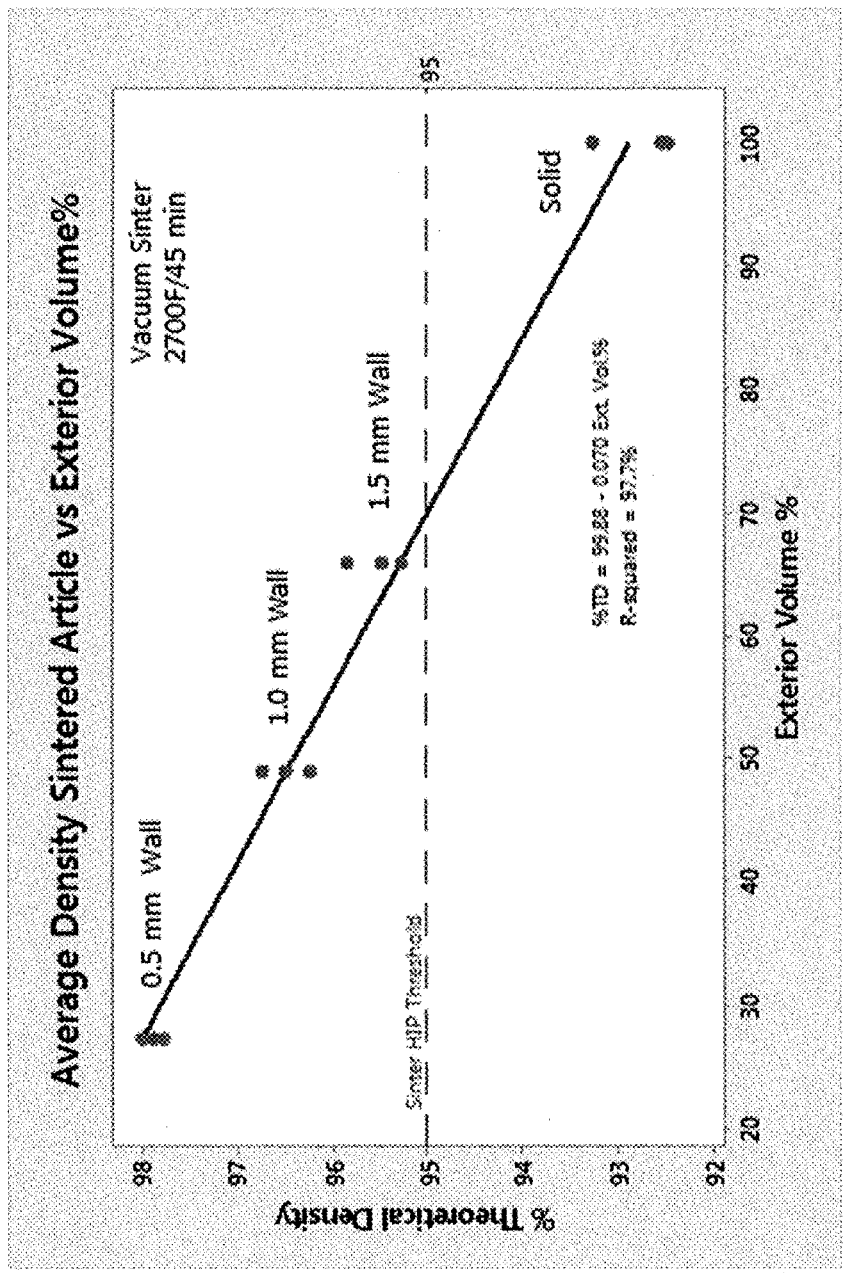
FIG. 2 illustrates a linear relationship between average density of the sintered article and exterior volume percent according to some embodiments.

As detailed above, employment of a loose powder component in conjunction with limiting volume of the porous exterior can provide composite articles of higher density, which can translate into articles of higher sintered density. In some embodiments, average density of the sintered article is at least 97 percent theoretical density. Average density of the sintered article can also be at least 98 percent theoretical density. In further embodiments, average density of the sintered article can be 95-99 percent theoretical density. Density of the sintered article can be dependent upon several considerations including, but not limited to, composite article density, compositional identity of the loose powder component, compositional identity of the porous exterior and sintering times, pressures and/or temperatures. In some embodiments, average density of the sintered article can vary linearly with volume percent of the porous exterior. For example, average density of the sintered article can increase linearly with decreasing volume percent of the porous exterior in the composite article. FIG. 2 illustrates a linear relationship between average density of the sintered article and exterior volume percent according to some embodiments. Average density of the sintered article is quantified as percent theoretical density. Sintered cemented carbide particles described above were employed in the porous exterior and the loose powder component to generate the data of FIG. 2.

Cross-sectional microscopy of the sintered articles underlying the data points of FIG. 2 are provided in FIG. 3. Table VIII provides details of the composite articles sintered to form the sintered articles represented in FIGS. 2 and 3.

TABLE VIII

Composite Article Parameters

Figure 3B:
FIGS. 3($a$)-3($d$) are cross-sectional optical microscopy images of sintered articles produced by binder jetting and sintering according to some embodiments.
Figure 3A:
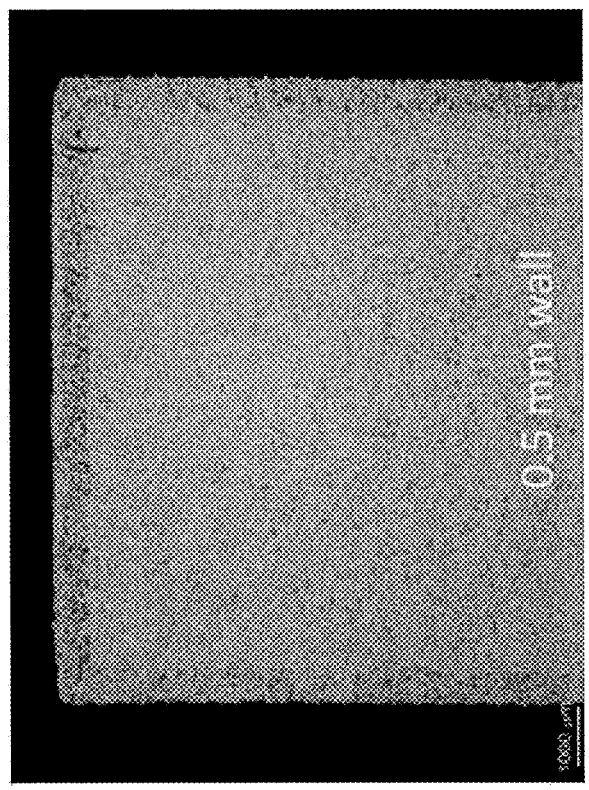
Figure 3D:
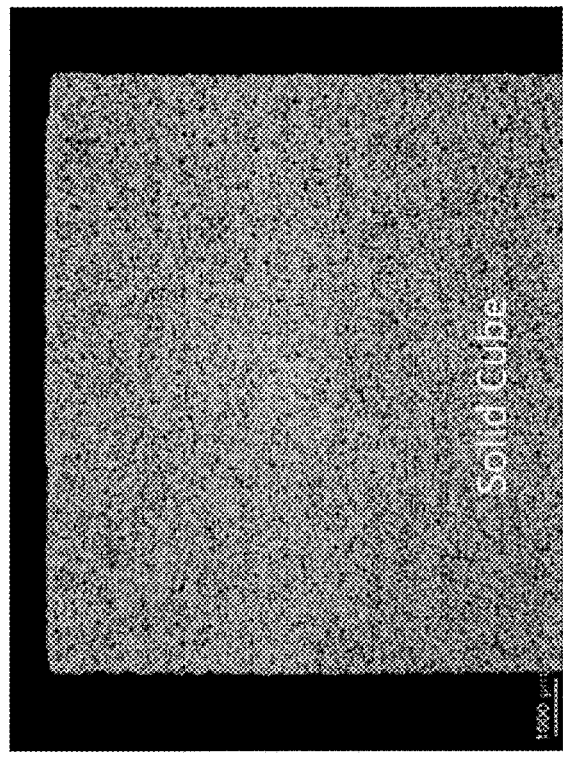
Figure 3C:
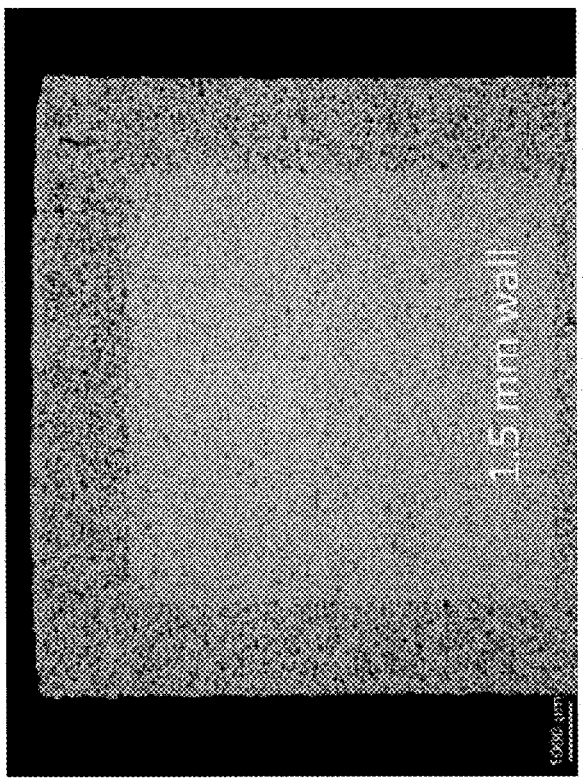

| Article | Powder Composition of Porous Exterior | Loose Powder Component of Interior | Porous Exterior Thickness (mm) | Volume Percent of Porous Exterior | Cross-sectional image |
|---|---|---|---|---|---|
| 1 | Sintered WC-Co Particles | Same as exterior | 0.5 | ~28 | FIG. 3(a) |
| 2 | Same as Article 1 | Same as Article 1 | 1.0 | ~50 | FIG. 3(b) |
| 3 | Same as Article 1 | Same as Article 1 | 1.5 | ~65 | FIG. 3(c) |
| 4 | Same as Article 1 | Same as Article 1 | Entire Article printed | 100 | FIG. 3(d) |

The composite articles of Table VIII were printed with a 3D printing system from ExOne of Huntingdon, PA A polyvinylpyrrolidone-polyethylene glycol (PVP-PEG) binder was used for printing the green exterior in a cube format. The porous exterior was formed around loose powder in the build box of the 3D printing apparatus. Accordingly, the composite articles were completely formed at the conclusion of the binder jetting process. The composite articles were cured at 200° C. for 4 hours in air to enhance green strength. The composite articles were subsequently vacuum sintered at 1480-1500° C. for 0.5-1 hour. As illustrated in the cross-section microscopy images, the sintered exterior is clearly evidenced from the sintered interior. The sintered interior, for example, exhibits lower porosity and higher density. Therefore, as illustrated in FIG. 2, Article 1 having the thinnest exterior displays the highest average sintered density. According to these principles, structure and density of sintered articles produced by additive manufacturing can be controlled and tailored to specific design.

Methods described herein provide additional technical enhancements and advantages. Higher densities of composite articles can lower sintering temperature and obviate the need for HIP cycles to produce article of high density via additive manufacturing techniques. Lower sintering temperatures can inhibit grain growth and provide fine grain sintered articles exhibiting high hardness and high wear resistance. Moreover, limiting binder to the article exterior can reduce or preclude defects, such as cracking and pore formation, due to gas expansion and gas pocket formation during thermal debindering. This has the added technical effect of enabling thicker articles not previously realized due to internal cracking and voids formed during debindering and/or sintering.

II. Sintered Articles

In another aspect, sintered articles are described herein. A sintered article, in some embodiments, comprises a sintered interior and a sintered exterior, the sintered exterior forming less than 30 volume percent of the sintered article, wherein a density and/or porosity gradient exists between the sintered interior and sintered exterior. The density and porosity gradients can have any values described in Section I above. In some embodiments, the sintered exterior can occupy a volume percent of the sintered article having a value selected from Table I herein. Additionally, the sintered exterior can have thickness according to a value selected from Table VI herein. FIGS. 3(a)-(c) illustrate a sintered article according to some embodiments. As illustrated in FIGS. 3(a)-(c), a density and porosity gradient exists between the sintered interior and sintered exterior.

The sintered interior and sintered exterior can be formed of any desired powder compositions, including the powder compositions described in Section I above. The sintered interior and sintered exterior can be of the same composition or of differing compositions. Further, an interface free of cracks and/or pores can exist between the sintered interior and sintered exterior. Sintered articles can be formed according to methods described in Section I, in some embodiments.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A sintered article comprising:
   a sintered interior having a shape and comprising a sintered loose powder component; and
   a sintered exterior having a sintered powder composition that comprises an organic binder, the sintered exterior forming 5-20 volume percent of the sintered article and being continuous with the sintered interior, wherein a density gradient or porosity gradient exists between the sintered interior and sintered exterior,
   wherein the sintered interior and the sintered exterior are made of different materials.

2. The sintered article of claim 1, wherein the sintered exterior has thickness of 0.1-1 mm.

3. The sintered article of claim 1, wherein average density of the sintered article is at least 98 percent theoretical density.

4. The sintered article of claim 1, wherein the sintered interior is greater than 99 percent theoretical density, and the sintered exterior is 92-95 percent theoretical density.

5. The sintered article of claim 1, wherein the sintered exterior has thickness less than 1 mm.

6. The sintered article of claim 1, wherein the sintered powder composition and the sintered loose powder component comprise a powder independently selected from the group consisting of powder metal and powder alloy.

7. The sintered article of claim 1, wherein the sintered powder composition and the sintered loose powder component comprise sintered cemented carbide particles.

8. The sintered article of claim 1, wherein the sintered powder composition and the sintered loose powder component comprise particles that are substantially monodisperse.

9. The sintered article of claim 1, wherein the sintered powder composition and the sintered loose powder component comprise particles that have average particle size of 5 to 90 μm.

10. The sintered article of claim 1, wherein the sintered powder composition and the sintered loose powder component comprise particles that have average particle size of 10 to 50 μm.

11. The sintered article of claim 1, wherein the sintered powder composition and the sintered loose powder component comprise a mixture of spherical particles and irregularly shaped particles.

12. The sintered article of claim 1, wherein the sintered powder composition and the sintered loose powder component comprise the same powder.

13. The sintered article of claim 1, wherein the powder of the sintered powder composition and the sintered loose powder component have the same average particle size.

14. A sintered article comprising:
   a sintered interior having a shape and comprising a sintered loose powder component; and
   a sintered exterior having a sintered powder composition that comprises an organic binder, the sintered exterior forming 10-30 volume percent of the sintered article and being continuous with the sintered interior, wherein a density gradient or porosity gradient exists between the sintered interior and sintered exterior, and an average particle size of a powder of the sintered loose powder component and of the sintered powder composition is the same,
   wherein the sintered interior and the sintered exterior are made of different materials.

15. The sintered article of claim 14, wherein the average particle size is 10-50 μm.

16. The sintered article of claim 14, wherein the sintered powder composition and the sintered loose powder component comprise sintered cemented carbide particles.

17. A sintered article comprising:
   a sintered interior comprising a sintered loose powder component; and
   a sintered exterior having a sintered powder composition that comprises an organic binder, the sintered exterior forming less than 30 volume percent of the sintered article, wherein a density gradient or porosity gradient exists between the sintered interior and sintered exterior, and average density of the sintered article increases linearly with decreasing volume percent of the sintered exterior, wherein
   the sintered interior and the sintered exterior are made of different materials.

18. The sintered article of claim 1, wherein the sintered loose powder component is continuously present in the sintered interior across a cross-section of the sintered article.

19. The sintered article of claim 14, wherein the sintered loose powder component is continuously present in the sintered interior across a cross-section of the sintered article.

20. The sintered article of claim 17, wherein the sintered loose powder component is continuously present in the sintered interior across a cross-section of the sintered article.

* * * * *